(12) United States Patent
Spooner (10) Patent No.: US 7,296,409 B2
(45) Date of Patent: Nov. 20, 2007

(54) ELECTRIC MOTOR ASSISTED TURBOCHARGER

(75) Inventor: Edward Spooner, Crook (GB)

(73) Assignee: Holset Engineering Company, Ltd., Heddersfield, West Yorkshire ( * ) Notice: Subject to any disclaimer, the term of this patent is extended or adjusted under 35 U.S.C. 154(b) by 0 days.

(21) Appl. No.: 10/768,358

(22) Filed: Jan. 30, 2004

(65) Prior Publication Data

US 2004/0216458 A1 Nov. 4, 2004

(30) Foreign Application Priority Data

Jan. 31, 2003 (GB) ................................ 0302235.7

(51) Int. Cl.
*F02B 33/44* (2006.01)
*H02K 21/12* (2006.01)
*H02K 21/22* (2006.01)
*H02K 17/00* (2006.01)
*H02K 7/18* (2006.01)

(52) U.S. Cl. .................. 60/608; 290/52; 310/156.01; 310/166; 310/155

(58) Field of Classification Search .......... 60/607–609, 60/597; 290/52; 318/765, 52; 310/105, 310/67 R, 191, 155, 156.01, 268, 208, 258, 310/156.12, 112, 166; 417/356; 219/631; 324/161

See application file for complete search history.

(56) References Cited

U.S. PATENT DOCUMENTS

| | | | | |
|---|---|---|---|---|
| 2,935,683 A | * | 5/1960 | Fauvelot | 324/161 |
| 3,233,867 A | | 2/1966 | Ishibashi et al. | 340/146.2 |
| 3,436,571 A | * | 4/1969 | French | 310/268 |
| 3,720,863 A | * | 3/1973 | Ringland et al. | 318/52 |
| 3,840,764 A | * | 10/1974 | Burger | 310/268 |
| 4,081,726 A | * | 3/1978 | Brimer et al. | 310/268 |
| 4,488,075 A | * | 12/1984 | DeCesare | 310/268 |
| 4,531,072 A | * | 7/1985 | Weaver et al. | 310/156.12 |
| 4,649,307 A | * | 3/1987 | Bech | 310/99 |
| 4,769,993 A | * | 9/1988 | Kawamura | 60/608 |
| 4,833,887 A | * | 5/1989 | Kawamura et al. | 60/608 |
| 5,017,087 A | * | 5/1991 | Sneddon | 417/356 |

(Continued)

FOREIGN PATENT DOCUMENTS

DE 1935246 B * 9/1975

(Continued)

OTHER PUBLICATIONS

Rodriges et al., "Energy saving when using rotation frequency control for centrifugal type superchargers," *Prom. Energ.* (USSR), published 1991, pp. 21-23. English language abstract included.

(Continued)

*Primary Examiner*—Thai-Ba Trieu
(74) *Attorney, Agent, or Firm*—Krieg DeVault LLP (57) ABSTRACT

A turbocharger comprises a turbine wheel and a compressor wheel mounted to a turbocharger shaft. An electric induction motor is provided for assisting rotation of the compressor wheel in predetermined circumstances. The motor comprises a fixed stator having motor field coils which generate a rotating magnetic field when energised by an AC control signal which induces eddy current flow in a rotor to generate a rotor magnetic field which in turn interacts with the stator magnetic field producing torque in the rotor.

12 Claims, 5 Drawing Sheets

U.S. PATENT DOCUMENTS

| | | | |
|---|---|---|---|
| 5,306,997 A | 4/1994 | Akiyama | 60/608 |
| 5,604,045 A | 2/1997 | Muraoka et al. | |
| 5,912,516 A * | 6/1999 | Atkinson et al. | 310/67 R |
| 5,914,065 A * | 6/1999 | Alavi | 219/631 |
| 5,939,793 A * | 8/1999 | Masberg et al. | 310/268 |
| 6,175,178 B1 * | 1/2001 | Tupper et al. | 310/166 |
| 6,177,746 B1 * | 1/2001 | Tupper et al. | 310/166 |
| 6,305,169 B1 * | 10/2001 | Mallof | 60/608 |
| 6,326,713 B1 * | 12/2001 | Judson | 310/112 |
| 6,879,081 B1 * | 4/2005 | Howard et al. | 310/258 |
| 6,911,759 B2 * | 6/2005 | Kalsi | 310/208 |
| 2002/0067091 A1 * | 6/2002 | Kliman et al. | 310/156.01 |
| 2003/0057793 A1 * | 3/2003 | Yang | 310/191 |
| 2004/0119374 A1 * | 6/2004 | Carl et al. | 310/268 |

FOREIGN PATENT DOCUMENTS

| | | | | |
|---|---|---|---|---|
| DE | 3304845 A1 * | 11/1984 | | |
| DE | P33 04 845 A1 | 11/1984 | | |
| EP | 01201891 A1 | 4/2002 | | |
| GB | 555178 A | 8/1943 | | |
| JP | 01122351 A | 5/1989 | | |
| JP | 02013253 A | 1/1990 | | |
| JP | 09046947 A * | 2/1997 | | |
| WO | WO 8808636 A1 * | 11/1988 | | 318/765 |
| WO | WO98/16728 | 4/1998 | | |

OTHER PUBLICATIONS

Vokkov et al., "Study of new types of axial-flow superchargers," *Tekh. Elektrodin.* (Ukrainian SSR), published Jan.-Feb. 1980, pp. 66-72. English language abstract included.

Katrasnik et al., "Improving of the dynamic characteristics of an automotive engine by a turbocharger assisted electric motor," *Trans. ASME*, J. Eng. Gas Turbine Power (USA), Apr. 2003, vol. 125, pp. 590-595.

Japanese Patent Office Abstract of JP 61237830 A, Turbo-Charger for Internal-Combustion Engine, Oct. 23, 1986, 1 page.

* cited by examiner

ELECTRIC MOTOR ASSISTED TURBOCHARGER

The present application claims priority to British Patent Application No. 0302235.7 filed Jan. 31, 2003, which is incorporated herein by reference.

BACKGROUND OF THE INVENTION

This invention relates to an electric motor assisted turbocharger, and in particular to a turbocharger for an internal combustion engine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted, an annular inlet passageway arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine chamber and rotates the turbine wheel.

Under steady state conditions of engine speed and load a conventional turbocharger can supply the required amount of air to the engine for efficient combustion. However, there are other conditions, such as at engine start up or transient conditions such as a sudden requirement for a high load from the engine, in which the energy in the exhaust gas is not sufficient to enable the turbocharger to deliver the required air supply to the engine quickly enough. Modern engines are designed to reduce engine fuelling in such circumstances to avoid high levels of exhaust emissions through incomplete combustion, and accordingly engine response suffers during such transient or other conditions.

It is known to address the above problem by providing a turbocharger with an integral electric motor to assist rotation of the compressor to improve the response of the turbocharger and thus the engine performance. An example of such an electric motor assisted turbocharger is disclosed in U.S. Pat. No. 5,604,045. The electric motor is essentially a synchronous motor located within the turbocharger bearing housing, and comprising a magnetic rotor assembly mounted to the turbocharger shaft surrounded by a fixed stator comprising field coils wound on magnetically permeable pole pieces. The operation of the synchronous motor is essentially conventional in that the field coils are energised with an AC supply to create a rotating magnetic field around the shaft which couples with the magnetic field of the magnetic rotor. The motor may be energised whenever the turbocharger requires power assistance to ensure optimum air supply to the engine.

With the above known form of electric motor assisted turbocharger, a synchronous motor comprising a magnetic rotor is used to avoid the need for commutation. A disadvantage of the synchronous motor is that relatively complicated control electronics are required as the excitation frequency of the stator coils must always be matched to the rotational speed of the turbocharger, so that both a variable frequency control signal and means for monitoring the speed of the turbocharger are required. See for instance the control system disclosed in PCT patent application WO98/16728.

SUMMARY OF THE INVENTION

It is an object of the present invention to obviate or mitigate the above disadvantages.

According to a first aspect of the present invention there is provided a turbocharger comprising:

a turbine wheel and a compressor wheel mounted to a turbocharger shaft;

an electric induction motor for assisting rotation of the compressor wheel in predetermined circumstances, the motor comprising a fixed stator having motor field coils which generate a rotating magnetic field when energised by an AC control signal which induces electric current flow in a rotor to generate a rotor magnetic field which interacts with the stator magnetic field producing torque in the rotor;

wherein the electric current flow induced in the rotor which generates said rotor magnetic field comprises eddy currents.

Since induced eddy currents are relied upon to produce the rotor magnetic field, the rotor may have an advantageously simple structure and may for instance comprise a unitary solid member. Since the motor is an induction motor commutation is not required. Moreover, since the motor is asynchronous there is no requirement to provide a variable AC control frequency in order to vary the rotational speed of the motor. These and other advantages of the present invention are described in more detail below.

The present invention also provides an AC induction motor comprising a stator having motor field coils which generate a rotating magnetic field when energised by an AC control signal which induces electric current flow in a rotor to generate a rotor magnetic field which interacts with the stator magnetic field to rotate said rotor about an axis, the electric flow induced in the rotor which generates said rotor magnetic field comprising eddy currents, and wherein the field coils are arranged in an annular array adjacent first and second axial surfaces of the rotor and the maximum diameter of the rotor is smaller than the outer diameter of the annular coil array such that eddy currents are induced in the rotor which flow from one axial side of the rotor to the other across the peripheral edge of the rotor.

This particular rotor and stator coil configuration enhances the efficiency of the motor in the manner described below. This improved motor may be used in applications other than the power assistance of turbochargers.

BRIEF DESCRIPTION OF THE DRAWINGS

Specific embodiments of the present invention will now be described, by way of example only, with reference to the accompanying drawings, in which.

DESCRIPTION OF THE EMBODIMENTS

Figure 1:
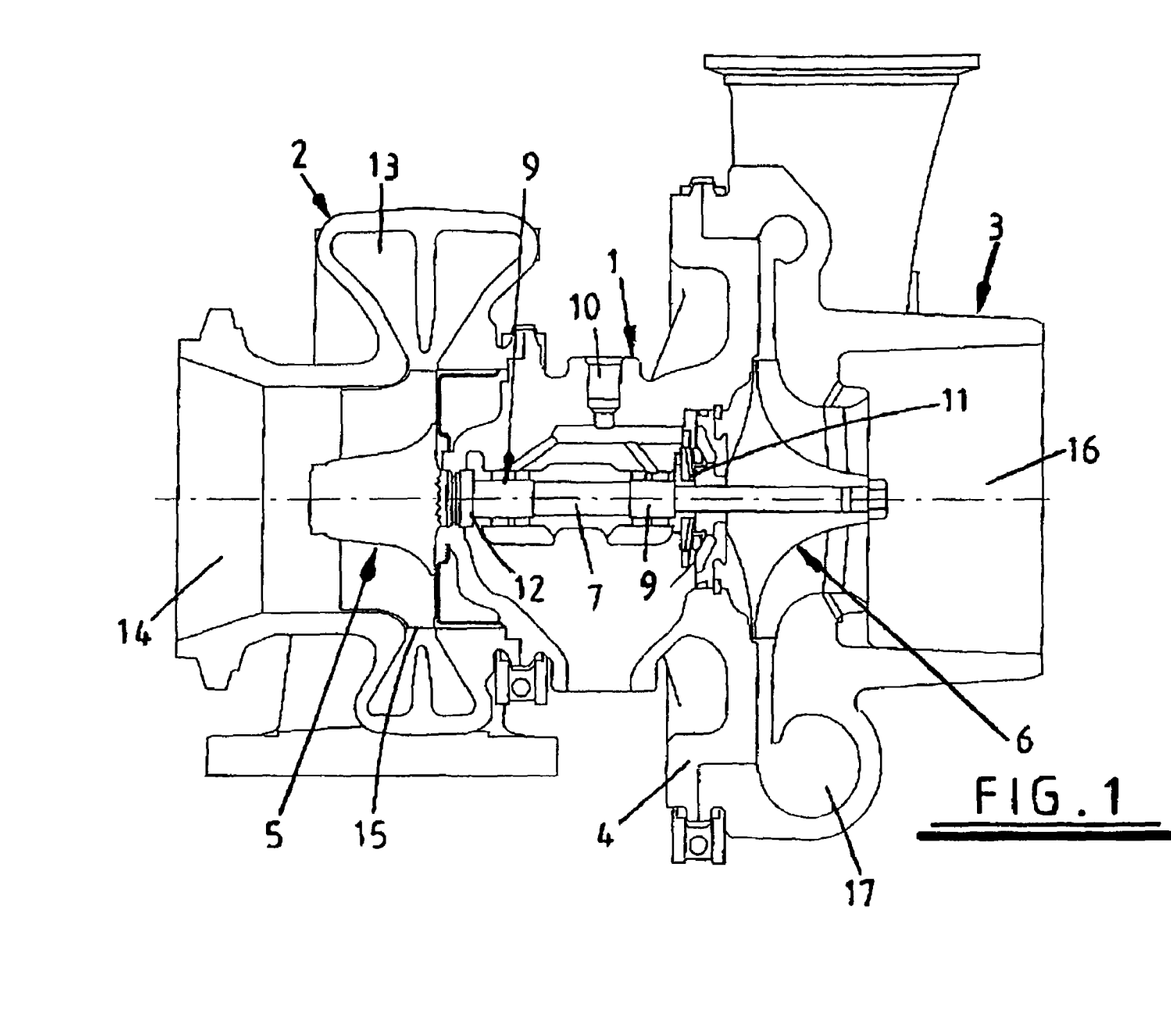
FIG. 1 is a cross-section through a conventional turbocharger schematically illustrating the major components.

Referring to FIG. 1, this shows a cross-section through a conventional turbocharger without electric motor assistance and is included to illustrate the major components of a turbocharger. The turbocharger comprises a central bearing housing 1 which interconnects a turbine housing 2 and a compressor housing which comprises a compressor cover 3 secured to an end flange 4 of the bearing housing 1. A turbine wheel 5 and a compressor wheel 6 are each mounted to opposite ends of a turbocharger shaft 7, which extends through the bearing housing 1, for rotation within the turbine housing 2 and compressor housing ¾ respectively. The turbocharger shaft 7 is mounted on bearing assemblies 9 located within the bearing housing 1. Oil is supplied to, and drained from, the bearing assemblies 9 via oil passages 10 and appropriate oil seal arrangements 11/12 are included at the compressor and turbine end of the bearing housing respectively. The turbine housing defines a volute or inlet chamber 13 to which exhaust gas from an internal combustion engine (not shown) is delivered. The exhaust gas flows from the inlet chamber 13 to an outlet 14 via an annular inlet passageway 15 defined around the turbine wheel 5. Accordingly, gas flowing from the inlet chamber 13 to the outlet 14 passes over, and thus rotates, turbine wheel 5 which as a result drives the compressor wheel 6 via the turbocharger shaft 7. Rotation of the compressor wheel 6 draws in air through a compressor inlet 16 and delivers compressed air to the intake of the engine (not shown) via an outlet volute 17.

Figure 2A:
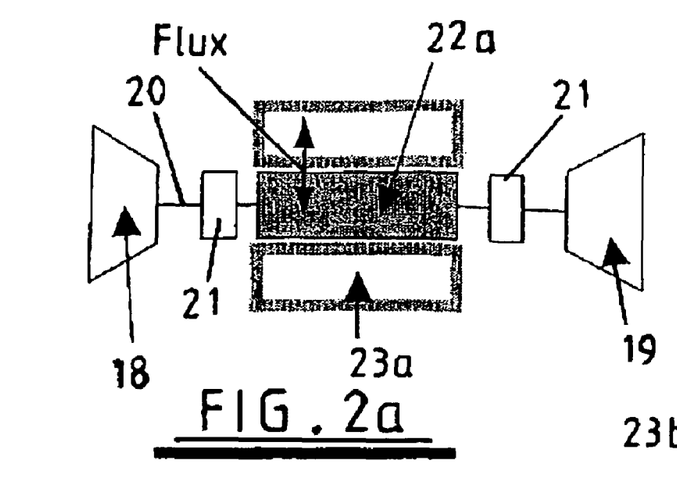
FIGS. 2a and 2b schematically illustrate two alternative configurations for the motor assisted turbocharger according to the present invention.
Figure 2B:
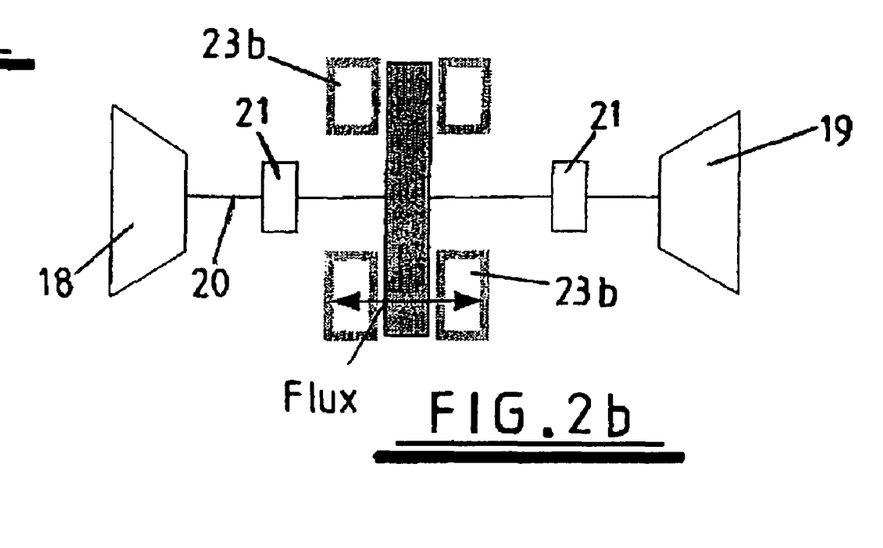

Referring now to FIGS. 2a and 2b, these schematically illustrate two alternative configurations of an electric motor assisted turbocharger in accordance with the present invention. In both figures, the turbine is illustrated by reference 18 and the compressor is illustrated by reference 19. The turbocharger shaft is represented by line 20 and the blocks 21 represent the bearing assemblies.

The electric motor of FIG. 2a comprises a rotor 22 mounted to the turbocharger shaft 20 between the bearing assemblies 21. In accordance with preferred embodiments of the invention the rotor may be a unitary solid member of a ferromagnetic material. The rotor 22a is surrounded by a fixed stator 23a, located within the bearing housing (not shown) which comprises an array of field coils wound around respective pole pieces which when appropriately energised with an AC supply will generate a rotating magnetic field in a conventional way.

With the configuration of FIG. 2a, the rotor 22a is generally cylindrical and the stator is arranged to generate magnetic flux which is radial relative to the rotor 22a and turbocharger shaft 21. In other words, this is a radial flux type motor. On the other hand, with the arrangement of FIG. 2b, the rotor 22b is again mounted for rotation with the turbocharger shaft 20, but in this case the rotor 22b is generally disc like and the stator field coils 23b are arranged to generate magnetic flux in an axial direction relative to the turbocharger shaft 20. This is achieved by arranging the stator coils in an annular array adjacent the disc shaped rotor 22b. This is an axial flux type motor and the basic arrangement of stator and rotor is again known.

In both radial and axial flux configurations, operation of the motor is essentially the same. The magnetic flux produced by the stator coils induces eddy currents in the surface of the solid ferromagnetic rotor which in turn generate a magnetic field which interacts with the stator field. In particular, as the stator magnetic field rotates, the interaction of the magnetic fields generated by the stator and the rotor causes the rotor to rotate. In other words, the motor is essentially an asynchronous AC induction motor, the operating principles of which are well known. Having said that, the motor in accordance with the present invention differs from that of a typical AC asynchronous induction motor in that the rotor is a simple "solid" rotor and the induced currents are eddy currents. With a more conventional AC asynchronous motor the rotor comprises a more complex coil assembly, such as the well known "squirrel cage" rotor assembly.

The electric motor assisted turbocharger according to the present invention thus avoids the control difficulties associated with the prior art asynchronous motor assisted turbochargers, whilst retaining the advantage of a commutator free rotor. Moreover, since the induced currents are eddy currents, the rotor of the present invention can be of a very simple construction, and could for instance be a unitary solid member such as a mild steel cylinder or disk (depending upon whether the motor is a radial or axial flux motor respectively). This has further advantages over the relatively complicated prior art magnetic rotor assemblies as for instance disclosed in U.S. Pat. No. 5,604,045 mentioned above, as well as typical coil rotors of conventional AC asynchronous motors (such as "squirrel cage" rotors).

Throughout this specification the rotor of the present invention is referred to as a 'solid' rotor. The term 'solid' is to distinguish the nature of the rotor from a typical laminated rotor of a conventional AC asynchronous electric motor. However, it will be appreciated that the rotor of the present invention does not for instance need to be a unitary member or indeed strictly solid (in the sense that it could have apertures or voids formed therein). A solid unitary rotor is however preferred for simplicity of construction and to provide minimum resistance to formation of eddy currents (see below).

The generation of eddy currents is a well known phenomenon. Eddy currents are swirling currents which are established in a block of conducting material placed in a changing magnetic field. The eddy currents swirl in a plane perpendicular to the magnetic field producing them and in turn produce a magnetic field of their own. The magnetic field produced by the eddy currents tends to oppose the change producing the eddy currents which generally leads to the generation of heat in the rotor. For this reason, the rotor cores of conventional AC induction motors are typically laminated to provide an increased resistance to the generation of eddy currents to minimise this heating effect. However, with the present invention the eddy currents are the only currents which flow in the rotor and provide the magnetic field for interaction with the rotating stator field.

With the electric motor assisted turbocharger of the present invention, the potential disadvantage of increased heat generation in the rotor, compared with a conventional induction or magnetic rotor, is more than compensated for by the advantages gained. The turbocharger is itself a high temperature environment and the solid rotor construction has much greater tolerance to heat flow from the surrounding turbocharger components than a conventional rotor structure. The solid rotor also has high resistance to rotational fatigue stresses and in particular can have fatigue characteristics to match those of other rotating components of the turbocharger such as the compressor wheel. The solid rotor is also much cheaper and simpler to manufacture and assemble than other conventional rotor structures.

It should also be noted that the heat generation in the rotor is proportional to the motor 'slip' speed. The term 'slip' will be well known to the person skilled in the art of AC motors and refers to the difference between the rotor rotational speed and the synchronous speed at any given time. With the electric motor assisted turbocharger of the present invention it is envisaged that the motor will generally only be require to assist the turbocharger when air flow, and thus turbocharger speed, is low. Thus relatively low synchronous speeds will generally be required with correspondingly low maximum slip speeds which will inherently avoid excessive heat generation.

Aside from the construction of the rotor together with the reliance on eddy currents to generate a magnetic field to interact with the stator field, and the difference in performance characteristics these features provide (as described below), operation of the present motor is essentially the same of any AC induction motor. In particular, the arrangement, constructions and excitation of the stator field coils can be entirely conventional. For instance, the AC power supply to the motor may have a fixed or variable frequency. However, a significant advantage of the use of an asynchronous motor (rather than a synchronous motor with a magnetic core as in the prior art mentioned above) is that a fixed frequency control signal may be used. This avoids the requirement to monitor the rotational speed of the turbocharger and vary the AC supply frequency accordingly, which greatly simplifies the control electronics required. The control system may therefore be much simpler and cheaper than the variable frequency control systems used in the prior art.

In common with any asynchronous AC motor, the torque generated in the rotor drops to zero as the rotor speed reaches the motor synchronous speed, i.e. the rotational speed of the stator magnetic field (which is a well known function of the AC supply frequency and coil arrangement, namely 120 times the AC supply frequency divided by the number of stator poles). However, unlike a conventional AC induction motor with a laminated cage rotor (e.g. squirrel cage) the torque vs. speed characteristic of the solid rotor motor provides a high starting torque which is maintained over a broad speed range before dropping sharply to zero as the speed of the rotor reaches the synchronous speed (at which point the motor may be de-excited to avoid generation of a retarding force). The motor is therefore able to provide a high accelerating torque over most of its torque curve which is available for assisting in rotation of the turbocharger.

Where the motor is excited by a fixed frequency AC supply the frequency (and thus synchronous speed of the motor) may be determined to correspond to a desired turbocharger speed below which the electric motor assistance is required. The synchronous speed can for example be selected to provide significant boost pressure for the engine corresponding to 60% load at full engine speed. The appropriate motor synchronous speed, and thus AC supply frequency, may be determined for each given engine type and application.

Figure 3:
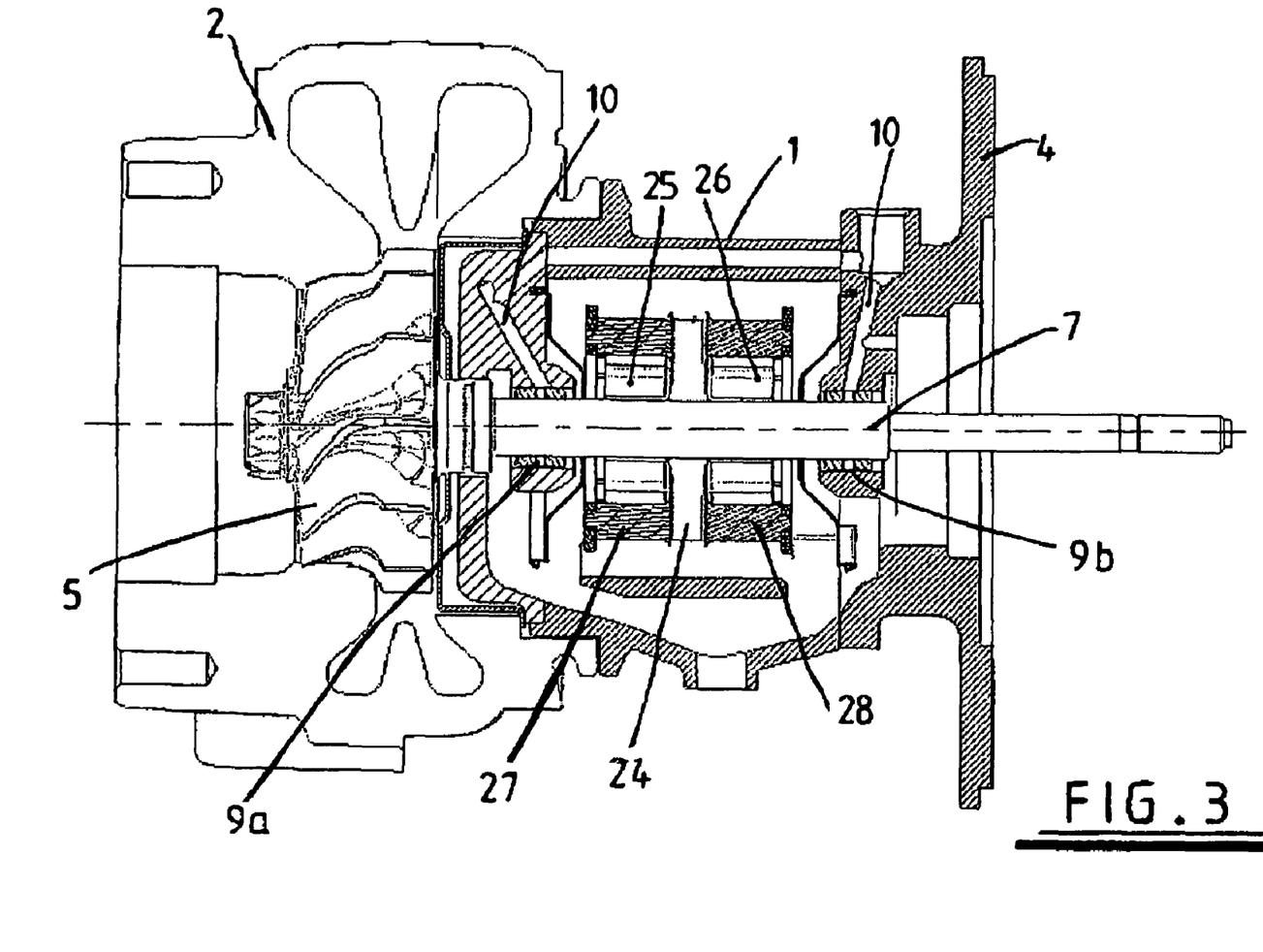
FIG. 3 is a cross-section through the turbine and bearing housings of a turbocharger including an electric motor in accordance with the present invention.

Referring now to FIG. 3, this is a cross-section through part of an electric motor assisted turbocharger in accordance with the present invention. Conventional features of the turbocharger are identified by the same reference numerals used above in relation to FIG. 1. Thus the illustrated turbocharger comprises a central bearing housing 1 which interconnects a turbine housing 2 and a compressor housing. In this illustration only the end flange 4 of the bearing housing which forms part of the compressor housing is shown—other components of the compressor are omitted but may be entirely conventional. A turbine wheel 5 and a compressor wheel (not shown) are each mounted to opposite ends of turbocharger shaft 7 which is mounted on bearing assemblies 9a and 9b located at the turbine and compressor ends of the bearing housing respectively. Other conventional features of the turbocharger will not be described in detail.

In accordance with the present invention, a solid disk shaped rotor 24 is mounted to the turbocharger shaft 7 for rotation therewith. Annular stator rings 25/26 surround the turbocharger shaft 7 and are fixed to the bearing housing 1 on either side of the disk shaped rotor 24. The stator rings carry conductor coils 27/28 for generating a rotating magnetic field when excited by an AC current. As such, the stator rings may be entirely conventional.

Together, the rotor 24 and stator rings 25/26 comprise an axial flux solid rotor AC induction motor. In this embodiment, the motor is located between the bearing assemblies 9a and 9b within the bearing housing 1, but in other embodiments the motor could be located between one or other of the bearing assemblies and the turbine/compressor end of the beating housing respectively.

Operation of the electric motor is as described above. The motor is energised by supply of an AC signal in accordance with a control scheme which determines when the turbocharger requires electric motor assistance. Such a scheme may be entirely conventional, and could for instance be programmed into the normal engine management electronic system. Typically assistance will be required during transient conditions, such as gear changes, or at start-up. The determination of when to activate/deactivate the motor does not form part of the present invention, rather this determination may be entirely conventional.

When the motor stator coils 27/28 are excited eddy currents are induced in the rotor 24 which generate magnetic fields which interact with the stator field. Accordingly, as the stator field rotates the rotor 24 rotates in accordance with normal induction motor principles.

As mentioned above, a preferred and particularly advantageous feature of the present invention is that the motor can be energised by a fixed frequency AC signal. This is not possible with a synchronous motor, and is problematic with conventional induction motors having laminated core coil rotors (such as a squirrel cage) in which the torque generated varies more widely with speed and with the solid rotor motor, and thus is much more dependant on the difference between the instantaneous rotor (and thus turbocharger) speed and the motor synchronous speed (determined by the excitation frequency).

The above described embodiment of the invention is an axial flux motor which is the preferred arrangement for a turbocharger as it has a more compact axial dimension than a radial flux motor. However, radial flux motors can be used and the particular configuration/location of the motor can vary widely to suit different turbocharger sizes and constructions.

Whereas the rotor is preferably a solid unitary member, the rotor could be comprised of a number of components, e.g. interconnected segments or annular sections. The term 'solid' rotor is used primarily to distinguish the rotor from a conventional induction motor rotor comprising conductor coils or equivalent arrangements in which the induced current flow in closed paths and which are generally constructed (laminated) so as to suppress induced eddy currents.

Figure 4A:
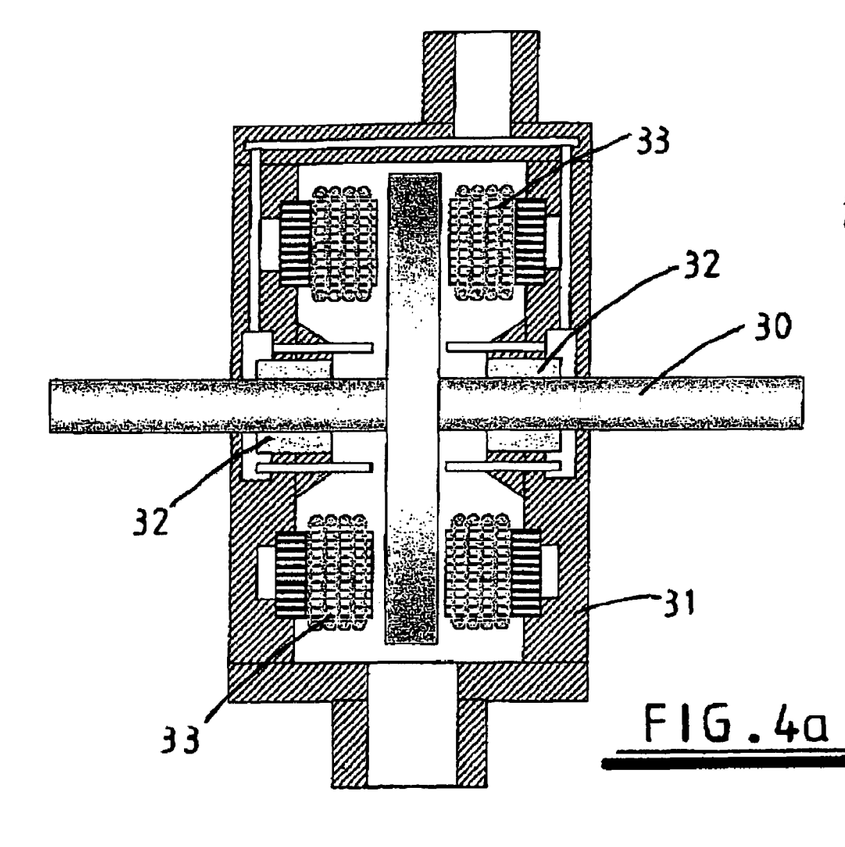
FIGS. 4a, 4b, 5a and 5b schematically illustrate motor assemblies in which exemplify a further aspect of the present invention.
Figure 4B:
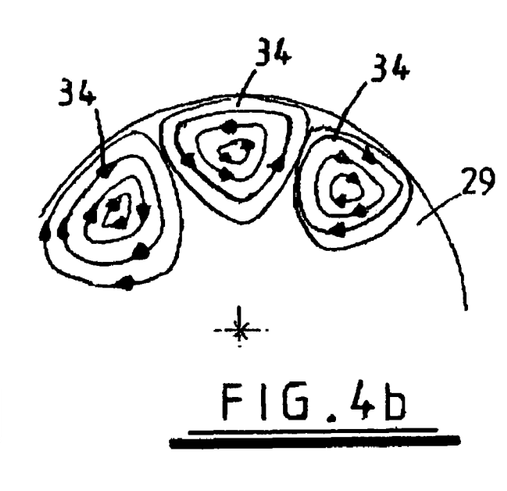

As is clear from the above description, the generation of eddy currents in the rotor is fundamental to operation of the present invention FIG. 4 schematically illustrates a motor arrangement with a modified rotor adapted to further reduce the resistance to eddy current flow. An aspect of the present invention which reduces eddy current resistance will now be described with reference to FIGS. 4 and 5.

FIG. 4a illustrates an axial flux solid rotor motor of structure similar to the axial motor arrangement described above. As such, the motor comprises a disc shaped rotor 29 mounted to a shaft 30 for rotation within a motor housing 31 on bearing assemblies 32. Two fixed stator rings comprising stator coils 33 are mounted on either side of the rotor 29. Upon excitation of the stator coils 33 eddy currents are induced on either side of the solid rotor and the rotor 29 operates as described above. FIG. 4b is an axial view of a section of the rotor 29 which schematically illustrates the swirling eddy currents 34 which are induced by three adjacent stator coils. From this it can be seen that the eddy currents flow is closed loops on each side of the rotor, flowing in a plane perpendicular to the axial flux generated by the stator fields. Each eddy current path has a section which generally follows the curvature of the radial outer periphery 29a of the rotor, the sections identified by references 34a. It will be appreciated that eddy currents on the opposite side of the stator ring to that illustrated it FIG. 4b will be formed in exactly the same way, and will have exactly the same configuration.

Figures 5A, 5B:
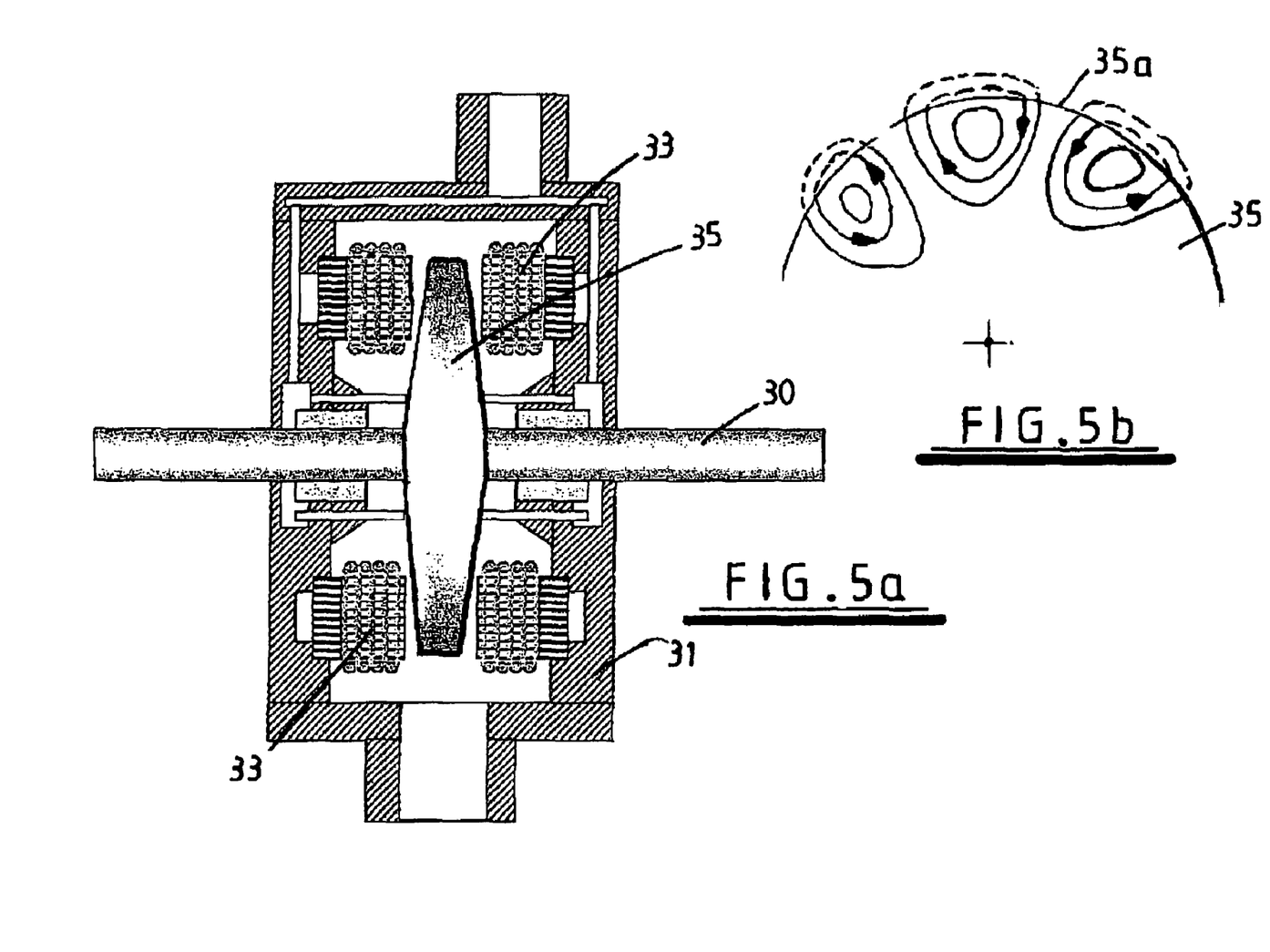

Referring now to FIG. 5a, the illustrated motor corresponds to that illustrated in FIG. 4a, and like reference numbers are used to identify like components, but has a modified rotor configuration. Specifically, the modified rotor 35 axially tapers towards its radially outermost edge, so that the axial dimension at the outer periphery of the rotor is significantly less than that of the rotor of FIG. 4a. Furthermore, the rotor 35 has a smaller outer radius than that of the stator coils 32.

Referring now to FIG. 5b, this is an axial view of one side of the rotor illustrating the path of the induced eddy currents in a similar way to FIG. 4b. Here it can be seen that because the rotor 35 has a smaller radius than the stator ring radius, some of the eddy current paths ate interrupted by the peripheral edge 35a of the rotor (dotted lines indicate the paths which would form if the rotor were of an increased radial dimension corresponding to that of the motor of FIGS. 4a and 4b. What in fact occurs is that the "interrupted" eddy currents circuits are completed by similar eddy currents on the opposing side of the rotor. In other words, rather than the formation of separate eddy currents on each side of the rotor, eddy currents are formed which flow across the outer peripheral edge of the rotor from one side of the rotor to the other. The effect of this is that the overall eddy current path length is reduced with a corresponding reduction in resistance thus increasing the efficiency of eddy current induction and thus the efficiency of the motor, with reduced heat generation.

The skilled person will appreciate that the modified rotor described above in relation to FIGS. 5a and 5b could have applications other than providing motor assistance to turbochargers. Thus, this aspect of the present invention provides a novel AC induction motor of wider application than the electric motor assistance of turbochargers.

The invention claimed is:

1. An AC induction motor, comprising:
a stator having motor field coils which generate a rotating magnetic field when energized by an AC control signal which induces electric current flow in a rotor to generate a rotor magnetic field which interacts with the stator magnetic field to rotate said rotor about an axis, the electric flow induced in the rotor which generates said rotor magnetic field comprising eddy currents, and wherein the field coils are arranged in an annular array adjacent first and second axial surfaces of the rotor and the maximum diameter of the rotor is smaller than the outer diameter of the annular coil array such that eddy currents are induced in the rotor which flow from one axial side of the rotor to the other across the peripheral edge of the rotor; and wherein the motor field coils are energized by a fixed frequency AC control signal such that the motor has a predetermined synchronous speed.

2. A turbocharger comprising:
a turbine wheel and a compressor wheel mounted to a turbocharger shaft;
an electric induction motor for assisting rotation of the compressor wheel in predetermined circumstances, the motor comprising a fixed stator having motor field coils which generate a rotating magnetic field when energized by an AC control signal which induces electric current flow in a rotor to generate a rotor magnetic field which interacts with the stator magnetic field producing torque in the rotor;
wherein the electric current flow induced in the rotor which generates said rotor magnetic field comprises eddy currents; and
wherein the control signal is a fixed frequency AC control signal such that the motor has a predetermined synchronous speed.

3. A turbocharger according to claim 2, wherein the rotor is non-laminated.

4. A turbocharger according to claim 2, wherein the motor is configured as an axial flux motor comprising an annular field coil array positioned adjacent the rotor, the array including the motor field coils.

5. A turbocharger according to claim 4, wherein the motor field coils are adjacent opposing axial surfaces of the rotor.

6. A turbocharger according to claim 5, wherein the maximum diameter of the rotor is smaller than the outer diameter of the annular coil array such that at least a portion of the eddy currents are induced to flow from one axial side of the rotor to another axial side across the peripheral edge of the rotor.

7. A turbocharger according to claim 6, wherein the rotor tapers radially towards the peripheral edge.

8. A turbocharger according to claim 2, wherein the motor is configured as a radial flux motor comprising a generally cylindrical rotor surrounded by an annular stator.

9. A turbocharger according to claim 2, wherein the rotor is mounted on the turbocharger shaft.

10. A turbocharger according to claim 2, comprising a bearing housing located between the turbine wheel and compressor wheel and housing bearings on which the turbocharger shaft rotates, wherein the electric motor is located within the bearing housing.

11. A turbocharger according to claim 10, wherein the rotor is mounted on the turbocharger shaft between bearing assemblies located towards the compressor and turbine ends of the bearing housing respectively.

12. A turbocharger comprising;
a turbine wheel and a compressor wheel mounted to a turbocharger shaft;
an electric induction motor for assisting rotation of the compressor wheel in predetermined circumstances, the motor comprising a fixed stator having motor field coils which generate a rotating magnetic field when energised by an AC control signal which induces electric current flow in a rotor to generate a rotor magnetic field which interacts with the stator magnetic field producing torque in the rotor; and wherein the electric current flow induced in the rotor which generates said rotor magnetic field comprises eddy currents, the motor is configured as an axial flux motor comprising an annular field coil array positioned adjacent a generally disc shaped rotor, stator coils are adjacent opposing axial surfaces of the rotor, the maximum diameter of the rotor is smaller than the outer diameter of the annular coil array such that eddy currents are induced which flow from one axial side of the rotor to the other across the peripheral edge of the rotor, and the rotor tapers radially towards its outer peripheral edge.

* * * * *